United States Patent
Regnard et al.

(10) Patent No.: US 11,708,790 B2
(45) Date of Patent: Jul. 25, 2023

(54) ACOUSTICALLY OPTIMIZED DISCHARGE LINE GRID WITH CHANNELS

(71) Applicants: SAFRAN AIRCRAFT ENGINES, Paris (FR); ECOLE CENTRALE DE LYON, Ecully (FR); CENTRE NATIONAL DE LA RECHERCHE SCIENTIFIQUE, Paris (FR); UNIVERSITE CLAUDE BERNARD LYON I, Villeurbanne (FR)

(72) Inventors: Josselin David Florian Regnard, Moissy-Cramayel (FR); Paul Clément Guillaume Laffay, Moissy-Cramayel (FR); Marc Cornelius Jacob, Toulouse (FR); Stéphane Moreau, Sherbrooke (FR)

(73) Assignees: SAFRAN AIRCRAFT ENGINES, Paris (FR); ECOLE CENTRALE DE LYON, Ecully (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 17/995,638

(22) PCT Filed: Apr. 6, 2021

(86) PCT No.: PCT/FR2021/050595
§ 371 (c)(1),
(2) Date: Oct. 6, 2022

(87) PCT Pub. No.: WO2021/205107
PCT Pub. Date: Oct. 14, 2021

(65) Prior Publication Data
US 2023/0124079 A1 Apr. 20, 2023

(30) Foreign Application Priority Data
Apr. 10, 2020 (FR) ...................... 2003664

(51) Int. Cl.
*F02C 6/08* (2006.01)
*F01D 17/12* (2006.01)
(Continued)

(52) U.S. Cl.
CPC ............... *F02C 6/08* (2013.01); *F01D 17/12* (2013.01); *F02K 3/075* (2013.01);
(Continued)

(58) Field of Classification Search
CPC .... F02C 9/18; F02C 6/08; F02K 3/075; F02K 1/386; F02K 3/06; F01D 17/105;
(Continued)

(56) References Cited

U.S. PATENT DOCUMENTS 6,565,313 B2 * 5/2003 Nikkanen ............... F01D 9/065
415/208.1
7,946,104 B2 * 5/2011 Frank ....................... F02K 1/72
60/785

(Continued)

FOREIGN PATENT DOCUMENTS

FR 3044705 A1 6/2017
FR 3109174 A1 * 10/2021
WO 2015110748 A1 7/2015

OTHER PUBLICATIONS

International Search Report and Written Opinion issued in International Application No. PCT/FR2021/050595 dated Jul. 28, 2021 with English Translation (14 pages).

*Primary Examiner* — Craig Kim
(74) *Attorney, Agent, or Firm* — Bookoff McAndrews, PLLC

(57) ABSTRACT

Discharge grate intended to be mounted inside or at the outlet of a conduit of a discharge valve of a turbine engine of an aircraft, the discharge grate comprising an upstream face intended to receive a gas flow, a downstream face
(Continued)

parallel to the upstream face and intended to deliver the gas flow received on the upstream face, and orifices passing through the perforated plate from the upstream face to the downstream face and intended to convey the gas flow through the perforated plate.

The discharge grate comprises for each orifice of the perforated plate a tubular channel, coaxial with the orifice with which it is associated, and projecting from the downstream face of the perforated plate.

12 Claims, 4 Drawing Sheets

(51) Int. Cl.
*F02K 3/075* (2006.01)
*F04D 27/02* (2006.01)

(52) U.S. Cl.
CPC .... *F04D 27/0207* (2013.01); *F05D 2220/323* (2013.01); *F05D 2240/12* (2013.01); *F05D 2260/60* (2013.01)

(58) Field of Classification Search
CPC ................ F01D 17/12; F05D 2260/96; F05D 2220/323; F05D 2240/12; F05D 2260/60; Y02T 50/60; F04D 27/0207
See application file for complete search history.

(56) References Cited

U.S. PATENT DOCUMENTS

| | | | | |
|---|---|---|---|---|
| 8,307,943 | B2* | 11/2012 | Klasing | F02K 3/075 |
| | | | | 138/40 |
| 8,931,284 | B2* | 1/2015 | Hussain | F02K 3/06 |
| | | | | 60/785 |
| 10,018,121 | B2* | 7/2018 | Taylor-Tibbott | B33Y 10/00 |
| 10,113,484 | B2* | 10/2018 | Glessner | F02C 9/18 |
| 10,480,454 | B2* | 11/2019 | Bruhat | F02K 3/075 |
| 11,506,132 | B1* | 11/2022 | Duranleau-Hendrickx | |
| | | | | F02C 9/18 |
| 2010/0043447 | A1* | 2/2010 | Kirby | F02K 3/075 |
| | | | | 60/785 |
| 2011/0167834 | A1* | 7/2011 | Britchford | F02C 7/24 |
| | | | | 239/399 |
| 2012/0006615 | A1* | 1/2012 | Klasing | F02K 3/075 |
| | | | | 137/561 A |
| 2012/0256107 | A1* | 10/2012 | Papamoschou | F02C 6/08 |
| | | | | 251/118 |
| 2015/0176500 | A1* | 6/2015 | Taylor-Tibbott | B33Y 10/00 |
| | | | | 60/785 |
| 2020/0378317 | A1* | 12/2020 | Joshi | F02C 6/08 |
| 2022/0252008 | A1* | 8/2022 | Sibbach | F02C 6/206 |
| 2022/0381181 | A1* | 12/2022 | Briley | F04F 5/463 |

* cited by examiner

[Fig. 1]
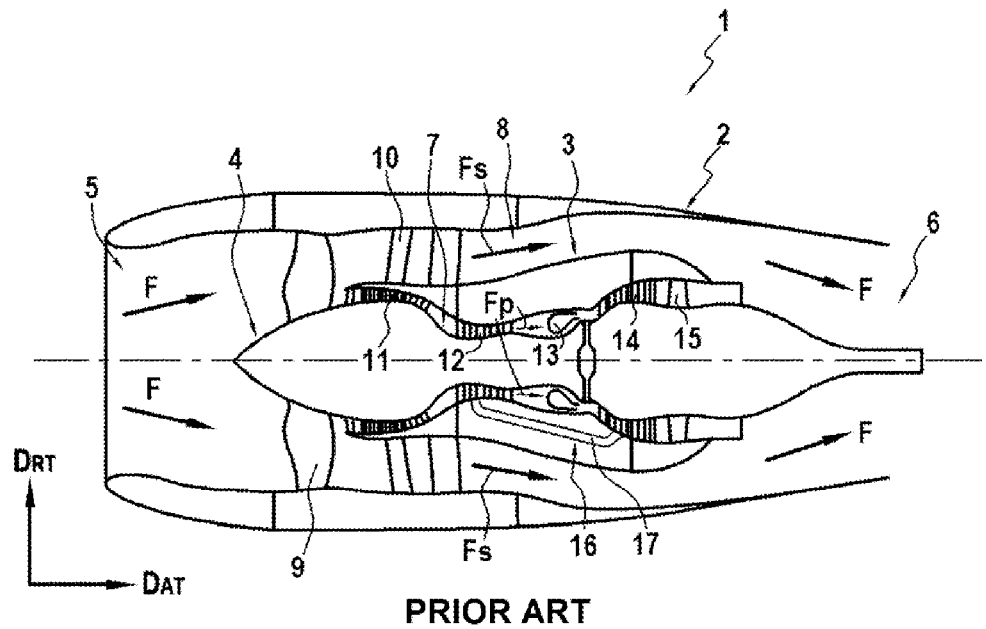
PRIOR ART
[Fig. 2]
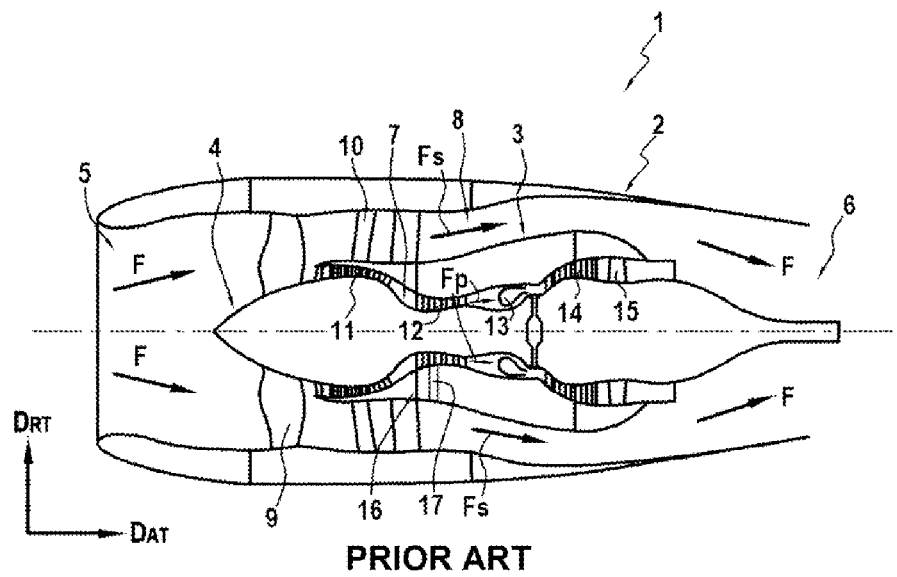
PRIOR ART

[Fig. 3A]
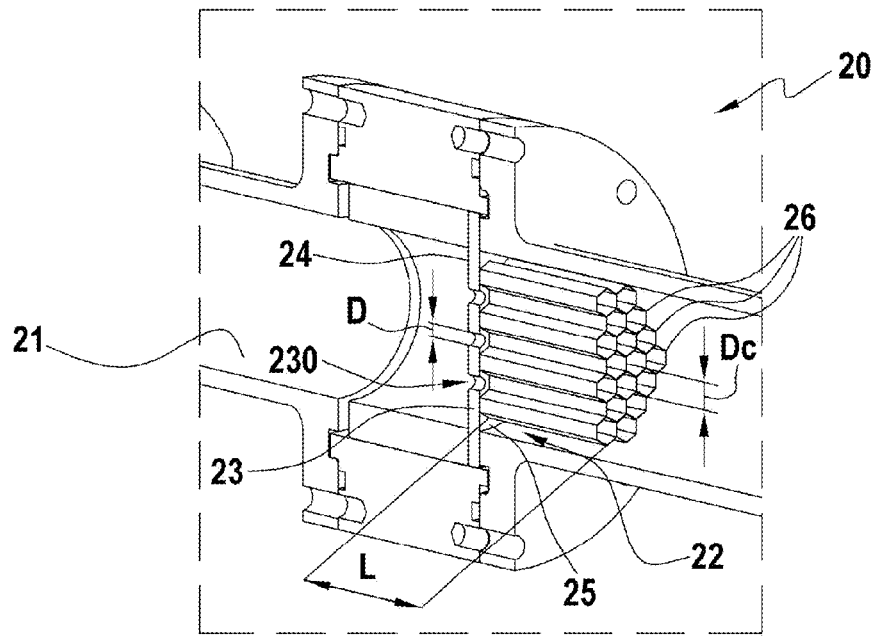
[Fig. 3B]
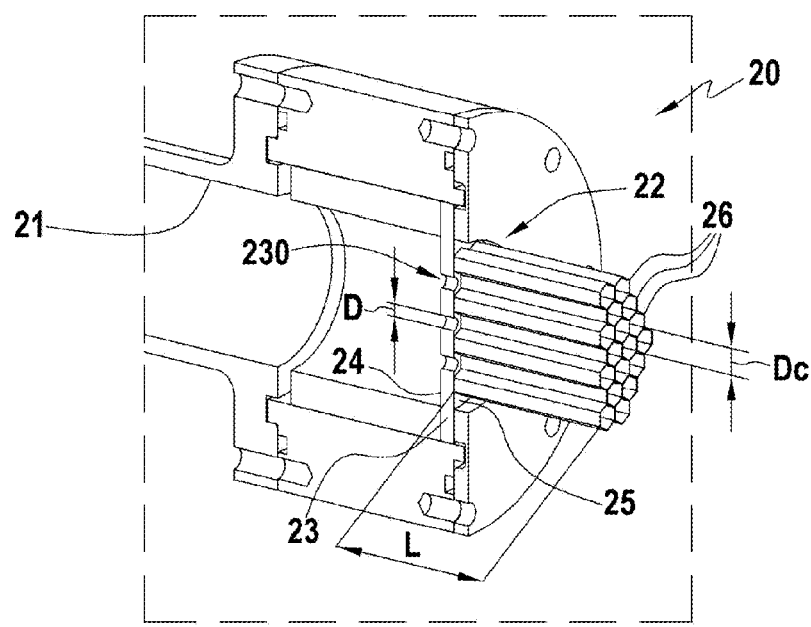

[Fig. 4]
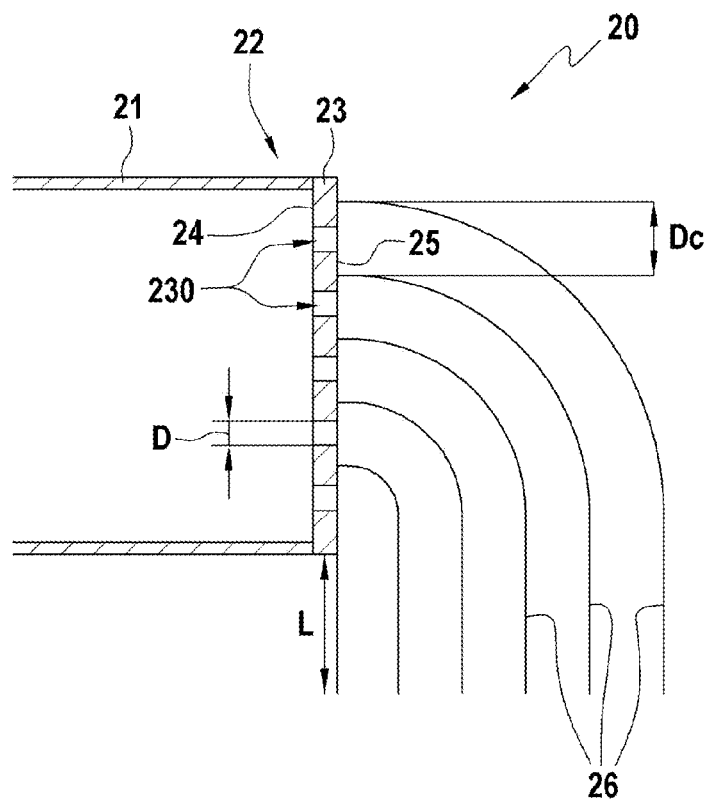
[Fig. 5]
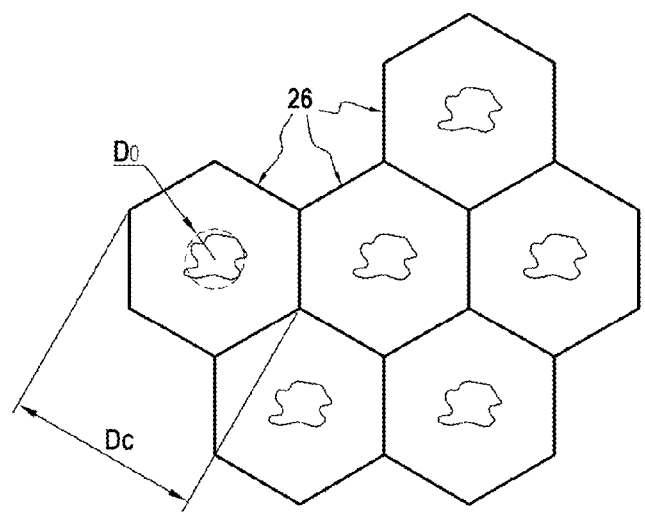

[Fig. 6]
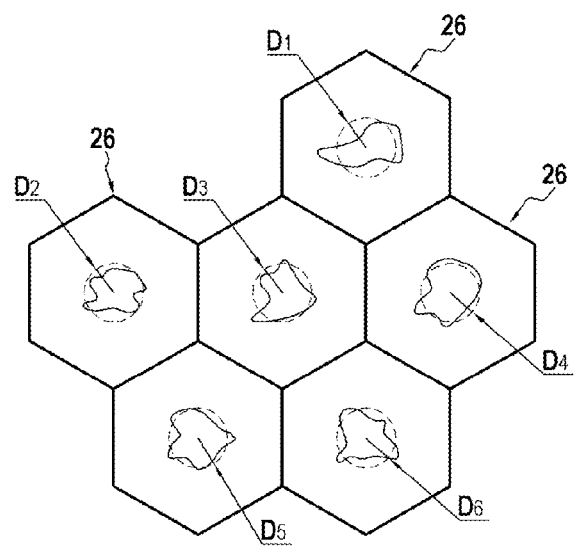

ACOUSTICALLY OPTIMIZED DISCHARGE LINE GRID WITH CHANNELS

CROSS-REFERENCE TO RELATED APPLICATION(S)

This patent application is a U.S. National Stage entry of International Patent Application No. PCT/FR2021/050595, filed on Apr. 6, 2021, which claims priority to French Application No. FR2003664, filed on Apr. 10, 2020.

TECHNICAL FIELD

The invention relates to the field of the noises of the propulsion systems of an aircraft, and more particularly the noises of the discharge valves used on the propulsion systems of the aircraft.

PRIOR ART

In most configurations, aircraft propulsion systems, such as turbofans, turboprops, or open rotors, are made up like the turbojet engine, a cross-sectional view of which in a longitudinal plane of the turbojet engine is shown in FIG. 1.

The turbojet engine 1 comprises a nacelle 2, an intermediate casing 3 and an internal casing 4. The nacelle 2 and the two casings 3 and 4 are coaxial and define an axial direction of the turbojet engine $D_{AT}$ and a radial direction of the turbojet engine DRT. The nacelle 2 defines at a first end an inlet channel 5 for a flow of fluid and at a second end, opposite the first end, an exhaust channel 6 for a flow of fluid. The intermediate casing 3 and the internal casing 4 delimit therebetween a primary flow path 7 for a fluid flow. The nacelle 2 and the intermediate casing 3 delimit therebetween a secondary flow path 8 for a fluid flow. The primary flow path 7 and the secondary flow path 8 are disposed in an axial direction of the turbojet engine $D_{AT}$ between the inlet channel 5 and the exhaust channel 6.

The turbojet engine 1 further comprises a fan 9 configured to deliver an air flow F as a fluid stream, the air flow F being divided at the outlet of the fan into a primary flow Fp circulating in the primary flow path 7 and into a secondary flow Fs circulating in the secondary flow path 8.

The secondary flow path 8 comprises a ring of rectifiers 10, and the primary flow path 7 comprises a low pressure compression stage 11, a high pressure compression stage 12, a combustion chamber 13, a high pressure turbine 14 and a low pressure turbine 15.

The propulsion systems of an aircraft generally comprise discharge valves 16 such as for example the valves referred to as "Variable Bleed Valves" (VBV), "Transient Bleed Valves" (TBV) or "Handling Bleed Valves" (HBV). These valves 16 have the function of regulating the operation of the turbojet engines 2, by adjusting the airflow at the inlet and/or at the outlet of the high pressure compressor 12, to increase the surge margin, at weak regime, or during acceleration or deceleration phases. The airflow thus withdrawn is evacuated through a conduit 17, then reintroduced into the secondary flow path 8 conveying the secondary flow Fs, or further downstream in the primary flow Fp, depending on the strategy used.

In the case where the airflow is reintroduced downstream of the primary flow path 7 conveying the primary flow Fp as illustrated in FIG. 1 (common case for regulating transient regimes), a common optimization practice of the system consists of the partial blocking of the conduit by a multi-perforated grate or a diaphragm. The advantage of this optimization is to generate a pressure drop allowing the thermodynamic conditioning of the flow to be adapted to the fluid medium in which it will be reintroduced, within controlled mass and size constraints. The case where the grate is positioned in the conduit is referred to as the conduit configuration.

In the case illustrated in FIG. 2, where the airflow is reintroduced into the secondary flow path 8 conveying the secondary flow Fs, or in the case where the airflow is reintroduced into the ambient medium (common case for the regulation of weak regimes), the conduit 17 of the discharge system is shorter and is, conventionally, devoid of a diaphragm. This being the case, it is common practice to position a grate at the downstream end of this conduit 17, in order to reduce the aero-acoustic phenomena generated by the ejection of gas at high speed. The case where the grate is positioned at the end of the conduit is called free configuration.

In the two cases illustrated in FIGS. 1 and 2, significant acoustic radiation results from the interaction between the perforated grate and the flow passing therethrough. This noise, which can go up to a high level on the scale of effective perceived noise in decibels, known under the abbreviation EPNdB, contributes to aircraft noise, during transitions of regimes and at weak regimes.

A grate having venturi-shaped orifices is known. The purpose of using this shape for the grate orifices is to initiate the flow at the neck (Mach number=1 at the neck) and to avoid uncontrolled formation of shocks downstream of the grate. This being the case, the proposed perforation configuration systematically gives rise to a break in the passage section at the upstream surface of the grate (transition between the passage section associated with the conduit and the passage section at the inlet in the grate).

Furthermore, document WO 2015/110748 describes a strategy for reintroducing the sampled load, as well as the use of a micro-perforated diaphragm to minimize the acoustic penalties associated with the supersonic phenomena generated downstream of this diaphragm.

Discharge valve grates are also known having parallel and horizontal channels, that is to say extending along the direction of the flow, to avoid a dead zone linked to the deviation provided by non-porous portions.

DISCLOSURE OF THE INVENTION

The invention aims at proposing an improved grate allowing to minimize the intensity of the aero-acoustic phenomena generated by this type of discharge system.

In one object of the invention, provision is made of a discharge grate intended to be mounted inside or at the outlet of a conduit of a discharge valve of a turbine engine of an aircraft, the discharge grate comprising a perforated plate including an upstream face intended to receive a gas flow, a downstream face opposite the upstream face and intended to deliver the gas flow received on the upstream face, and orifices passing through the perforated plate from the upstream face to the downstream face and intended to convey the gas flow intended to pass through the perforated plate.

According to a general characteristic of the invention, the discharge grate further comprises for each orifice of the perforated plate a tubular channel, coaxial with the orifice with which it is associated, and extending from the downstream face of the perforated plate in a direction orthogonal to the plane in which the perforated plate extends.

The channels mounted on the downstream face of the perforated plate allow to limit the interaction between the different jets coming from each orifice of the perforated plate of the discharge grate. Each jet thus develops independently of the others within its channel.

According to a first aspect of the discharge grate, the channels can form a honeycomb structure.

This geometric honeycomb configuration provides design simplicity as well as optimization of the mixing surface of each acoustic cell formed by each channel of the honeycomb structure.

According to a second aspect of the discharge grate, the channels may comprise a passage section defined in a plane parallel to the downstream face of the perforated plate, the passage section of the channels having a greatest length in the plane of the section comprised between one and five times a characteristic diameter of the orifices.

In the case where the orifices of the perforated plate are circular holes, the characteristic diameter corresponds to the diameter of each orifice.

In the case where the orifices of the perforated plate are not circular but nevertheless of uniform shape and distribution, the characteristic diameter corresponds to the diameter of a circular section equivalent to the surface of an orifice.

In the case where the orifices of the perforated plate are neither circular nor of equivalent shape, but nevertheless of uniform distribution, the characteristic diameter corresponds to the average of the diameters of the sections equivalent to the surface of each orifice.

A channel section that is too small, that is to say less than the characteristic diameter, would imply low dissipation of the isolated jet coming from each orifice of the perforated plate. On the contrary, a channel with a section that is too large, that is to say greater than five times the characteristic diameter, would not optimize the overall dimensions in the engine integration.

According to a third aspect of the discharge grate, the passage section of the channels preferably has a greatest length in the plane of the section equal to twice the characteristic diameter of the orifices.

This dimension has an optimum allowing both the isolated jets to develop and dissipate while limiting the blocking of the channels.

According to a fourth aspect of the discharge grate, the channels can extend, in a direction orthogonal to the plane in which the perforated plate extends, over a length comprised between one time and one hundred times the characteristic diameter of the orifices.

This length of channels allows to limit the interaction of the jets while allowing the dissipation of the energy of each jet associated with each orifice. The optimal length depends on the flow speed and therefore on the aerodynamic operating point. The range of lengths defined above allows to cover the operating ranges of the discharge valves of turbomachines whose purpose is the propulsion of aircraft.

According to a fifth aspect of the discharge grate, the channels can all be cylindrical, straight and all have the same length.

Alternatively, the channels may be non-rectilinear channels to guide the flow in a direction distinct from the direction orthogonal to the plane in which the perforated plate extends.

In another object of the invention, provision is made of a discharge valve for an aircraft turbojet engine comprising a conduit intended to convey a gas flow and at least one discharge grate as defined above and mounted inside the conduit or on an outlet of the conduit.

According to a first aspect of the discharge valve, the discharge grate can be mounted inside the conduit.

According to a second aspect of the discharge valve, the discharge grate can be mounted at the outlet of the conduit.

In another object of the invention, provision is made of a turbojet engine comprising a nacelle, a coaxial intermediate casing and internal casing, and a discharge valve as defined above, the intermediate casing and the internal casing delimiting therebetween a primary flow path for a fluid flow, the nacelle and the intermediate casing delimiting therebetween a secondary flow path for a fluid flow, and the discharge valve being mounted between the primary flow path and the secondary flow path and configured to withdraw a portion of the air in the primary flow path and deliver it into the secondary flow path.

In another object of the invention, provision is made of a turbojet engine comprising a nacelle, a coaxial intermediate casing and internal casing, and a discharge valve as defined above, the intermediate casing and the internal casing delimiting therebetween a primary flow path for a fluid flow in which a combustion chamber is mounted, the nacelle and the intermediate casing delimiting therebetween a secondary flow path for a fluid flow, and the discharge valve being configured to withdraw a portion of the air in the primary flow path upstream of the combustion chamber and deliver it into the primary flow path downstream of the combustion chamber.

BRIEF DESCRIPTION OF THE DRAWINGS

FIG. 1, already described, shows a sectional view in a longitudinal plane of a turbojet engine according to the prior art with a discharge valve with reinjection into the primary flow.

FIG. 2, already described, shows a sectional view in a longitudinal plane of a turbojet engine according to the prior art with a discharge valve with reinjection into the primary flow.

FIG. 3A schematically illustrates a sectional view of a discharge valve according to a first embodiment of the invention respectively with the grate disposed inside the conduit.

FIG. 3B schematically illustrates a sectional view of a discharge valve according to a first embodiment of the invention respectively with the grate mounted at the outlet of the conduit.

FIG. 4 schematically shows a sectional view of a grate of a discharge valve according to a second embodiment respectively with the grate disposed inside the conduit.

FIG. 5 schematically shows a sectional view of a portion of a grate of a discharge valve according to a third embodiment respectively with the grate disposed inside the conduit.

FIG. 6 schematically shows a sectional view of a portion of a grate of a discharge valve according to a fourth embodiment respectively with the grate disposed inside the conduit.

DESCRIPTION OF EMBODIMENTS

FIGS. 3A and 3B schematically illustrate two sectional views of a discharge valve according to a first embodiment of the invention respectively with the grate disposed inside the conduit and at the outlet of the conduit of the discharge valve.

The discharge valve 20 for an aircraft turbojet engine comprises a conduit 21 intended to convey a gas flow F and a grate 22. The grate 22 includes a plate 23 perforated with a multitude of orifices 230 and channels 26.

The perforated plate 23, through which the gas flow F passes, comprises a first face 24, or upstream face, facing the gas flow F, that is to say receiving the flow F, and a second face 25, or downstream face, through which the flow F escapes after having passed through the perforated plate 23 via the orifices 230. The second face 25 is opposite the first face 24 and parallel thereto. The orifices 230 thus pass through the plate 23 from the upstream face 24 to the downstream face 25.

The grate 22 comprises a channel 26 for each orifice 230 of the plate 23. Each channel 26 extends from the downstream face 25 of the plate 23 is coaxial with the associated orifice with which it is associated.

In the first embodiment illustrated in FIGS. 3A and 3B, each channel 26 forms a hollow cylinder with any base, and preferably with a circular or hexagonal base, the generatrices of which extend in a direction orthogonal to the plane in which extends the perforated plate 23. In other words, the channels 26 form rectilinear hollow cylinders of identical length L. And in case the cylinders are hexagonal based, together they form a honeycomb structure.

The channels 26 thus allow the development of the jets coming from the orifices 230 while delaying the interaction between the various jets as much as possible.

The grate 22 has an outer perimeter whose shape corresponds to the shape of the inner perimeter of the conduit 21. In FIG. 3A, the grate 22 is inserted inside the conduit 21 to partially block the conduit 21 on a section located between the inlet and the outlet of the conduit 21, while in FIG. 3B, the grate 22 is inserted at one end of the conduit 21 inside the conduit 21 to partially block the outlet of the conduit 21. In both cases, the conduit 21 is only partially blocked in that the flow F can flow through the channels of the grates 22, and only through these channels 23.

The plane in which the sectional views of FIGS. 3A and 3B are produced is a plane comprising the direction along which the conduit 21 extends, in other words an axial direction DA of the cylinder formed by the conduit 21 within the context of the example illustrated in FIGS. 3A and 3B, and a direction orthogonal to the axial direction DA and parallel to the plane in which the perforated plate 22 extends, that is to say a radial direction DR.

FIG. 4 schematically illustrates a schematic sectional view of a discharge valve according to a second embodiment of the invention respectively with the grate disposed inside the conduit and at the outlet of the conduit of the discharge valve.

The second embodiment differs from the first embodiment illustrated in FIGS. 3A and 3B in that the channels 26 are not rectilinear hollow cylinders but non-rectilinear tubes forming an angle of 90° to deflect the jets in a direction different from the direction of incidence of the gas flow F on the grate 22. The length L of the channel 26 corresponds in this embodiment to the length of the tube over its entire path.

In the two embodiments shown in FIGS. 3A, 3B and 4, the orifices 230 are circular orifices having a diameter D, and the channels have a length L comprised between one time the diameter D and one hundred times the diameter D, that is to say D<L<100D, while the base of the cylinders or the section of the tubes has a diameter Dc comprised between one time the diameter D and five times the diameter D, that is to say D<Dc<5Dc.

In the case where the orifices of the perforated plate are not circular but nevertheless of uniform shape and distribution on the perforated plate as shown in FIG. 5, the characteristic diameter corresponds to the diameter $D_0$ of a circular section equivalent to the surface of an orifice.

In the case where the orifices of the perforated plate are neither circular nor of equivalent shape, but nevertheless of uniform distribution as illustrated in FIG. 6, the characteristic diameter corresponds to the average of the diameters $D_1$ to $D_6$ of the sections equivalent to the surface of each orifice.

A channel section that is too small, that is to say less than the characteristic diameter, would imply low dissipation of the isolated jet coming from each orifice of the perforated plate. On the contrary, a channel with a section that is too large, that is to say greater than five times the characteristic diameter, would not optimize the overall dimensions in the engine integration.

The discharge valves according to the first and second embodiments are intended to be mounted on turbojet engines such as those shown in FIGS. 1 and 2.

The invention thus allows to have a discharge valve equipped with an improved grate allowing to minimize the intensity of the aero-acoustic phenomena generated by the relief systems equipped with a perforated grate.

The invention claimed is:

1. A discharge grate intended to be mounted inside or at the outlet of a conduit of a discharge valve of a turbine engine of an aircraft, the discharge grate including a perforated plate comprising an upstream face intended to receive a gas flow, a downstream face intended to deliver the gas flow received on the upstream face, and orifices passing through the perforated plate from the upstream face to the downstream face and intended to convey the gas flow through the perforated plate,
   wherein the discharge grate comprises for each orifice of the perforated plate a tubular channel, coaxial with the orifice with which it is associated, and projecting from the downstream face of the perforated plate.

2. The discharge grate according to claim 1, wherein the channels form a honeycomb structure.

3. The discharge grate according to claim 1, wherein the channels comprise a passage section defined in a plane parallel to the downstream face of the perforated plate, the passage section of the channels having a greatest length in the plane of the section comprised between one and five times a characteristic diameter of the orifices.

4. The discharge grate according to claim 3, wherein the passage section of the channels has a greatest length in the plane of the section equal to twice the characteristic diameter of the orifices.

5. The discharge grate according to claim 1, wherein the channels extend between a first open end communicating with an orifice and a second open end over a length comprised between one time and one hundred times the characteristic diameter of the orifices.

6. The discharge grate according to claim 5, wherein the channels are all cylindrical, straight and all have the same length.

7. The discharge grate according to claim 5, wherein the channels are non-rectilinear channels to guide the flow in a direction distinct from the direction orthogonal to the plane in which the perforated plate extends.

8. A discharge valve for an aircraft turbojet engine comprising a conduit intended to convey a gas flow and at least one discharge grate according to claim 1 mounted inside the conduit or on an outlet of the conduit.

9. The discharge valve according to claim 8, wherein the discharge grate is mounted inside the conduit.

10. The discharge valve according to claim 8, wherein the discharge grate is mounted at the outlet of the conduit.

11. A turbojet engine comprising a nacelle, a coaxial intermediate casing and internal casing, and a discharge valve according to claim 8, the intermediate casing and the internal casing delimiting therebetween a primary flow path for a fluid flow, the nacelle and the intermediate casing delimiting therebetween a secondary flow path for a fluid flow, and the discharge valve being mounted between the primary flow path and the secondary flow path and configured to withdraw a portion of the air in the primary flow path and deliver it into the secondary flow path.

12. The turbojet engine comprising a nacelle, a coaxial intermediate casing and internal casing, and a discharge valve according to claim 8, the intermediate casing and the internal casing delimiting therebetween a primary flow path for a fluid flow in which a combustion chamber is mounted, the nacelle and the intermediate casing delimiting therebetween a secondary flow path for a fluid flow, and the discharge valve being configured to withdraw a portion of the air in the primary flow path upstream of the combustion chamber and deliver it into the primary flow path downstream of the combustion chamber.

\* \* \* \* \*